(12) United States Patent
Canavan

(10) Patent No.: US 6,196,681 B1
(45) Date of Patent: Mar. 6, 2001

(54) EYE COVERING

(75) Inventor: Richard W. Canavan, Woodstock, CT (US)

(73) Assignee: Bacou USA Safety, Inc., Smithfield, RI (US)

( * ) Notice: Subject to any disclaimer, the term of this patent is extended or adjusted under 35 U.S.C. 154(b) by 0 days.

(21) Appl. No.: 09/573,577

(22) Filed: May 18, 2000

(51) Int. Cl.[7] ..................................... G02C 1/04
(52) U.S. Cl. ...................... 351/106; 351/103; 351/83; 351/86
(58) Field of Search .................. 381/83, 86, 87, 381/84, 85, 88, 89, 44, 103, 106, 104, 105, 108, 109, 62

(56) References Cited

U.S. PATENT DOCUMENTS

| 5,381,192 | 1/1995 | Canavan et al. | 351/118 |
| 5,457,505 | 10/1995 | Canavan et al. | 351/118 |
| 5,703,669 | * 12/1997 | Park | 351/86 |

* cited by examiner

*Primary Examiner*—Hung Xuan Dang
(74) *Attorney, Agent, or Firm*—Fish & Richardson P.C.

(57) ABSTRACT

A unitary structure for an eye covering comprises an outer hard portion chemically bonded to an inner soft portion made by a two-shot process in a single mold.

8 Claims, 5 Drawing Sheets

EYE COVERING

CROSS-REFERENCE TO RELATED APPLICATIONS

Not Applicable.

STATEMENT REGARDING FEDERALLY SPONSORED RESEARCH OR DEVELOPMENT

Not Applicable.

The present invention relates in general to eye covering, and more particularly concerns novel eyeglasses especially useful in connection with comfortably affording eye protection.

BACKGROUND OF THE INVENTION

For background, reference is made to U.S. Pat. No. 5,457,505, which describes eyewear construction. Reference is also made to commercially available sport glasses such as Nike sport glasses that include some structure made by a two-shot process in a single mold.

BRIEF SUMMARY OF THE INVENTION

According to the invention, there is a unitary structure made by a two-shot process in a single mold having an outer hard portion chemically bonded to an inner soft portion formed with a brow portion adapted to softly engage the brow of a wearer, a nose portion adapted to softly engage the nose of a wearer, with brow and nose portions of hard material adapted to engage temple frame pieces. The brow hard portions are adapted to engage hard material ratchet adjustment pieces as well as a transparent lens structure adapted to cover the eyes of a wearer. The eyeglasses according to the invention include the lens portion seated in the hard brow portion and the temple pieces seated in the hard end portions of the brow portion. A feature of the invention is forming the nose piece with flexible fingers for comfortably engaging the nose of a wearer while maintaining the eyeglasses in a stable position on the nose of the wearer, the length of each finger being significantly shorter than the length of each length of the nose piece with the spacing between fingers corresponding substantially to the thickness of the fingers and the length of the fingers progressively decreasing from the center to each end of each nose piece leg. The fingers provide an adjustment feature by bending to correspond to the size and shape of various noses.

It is an important object of the invention to provide improved eye covering structure.

Additionally, the soft material is intended to provide a shock-absorbing feature for the face.

Other features, object and advantages of the invention will become apparent from the following detailed description when read in connection with the accompanying drawings in which:

DETAILED DESCRIPTION

Figure 1:
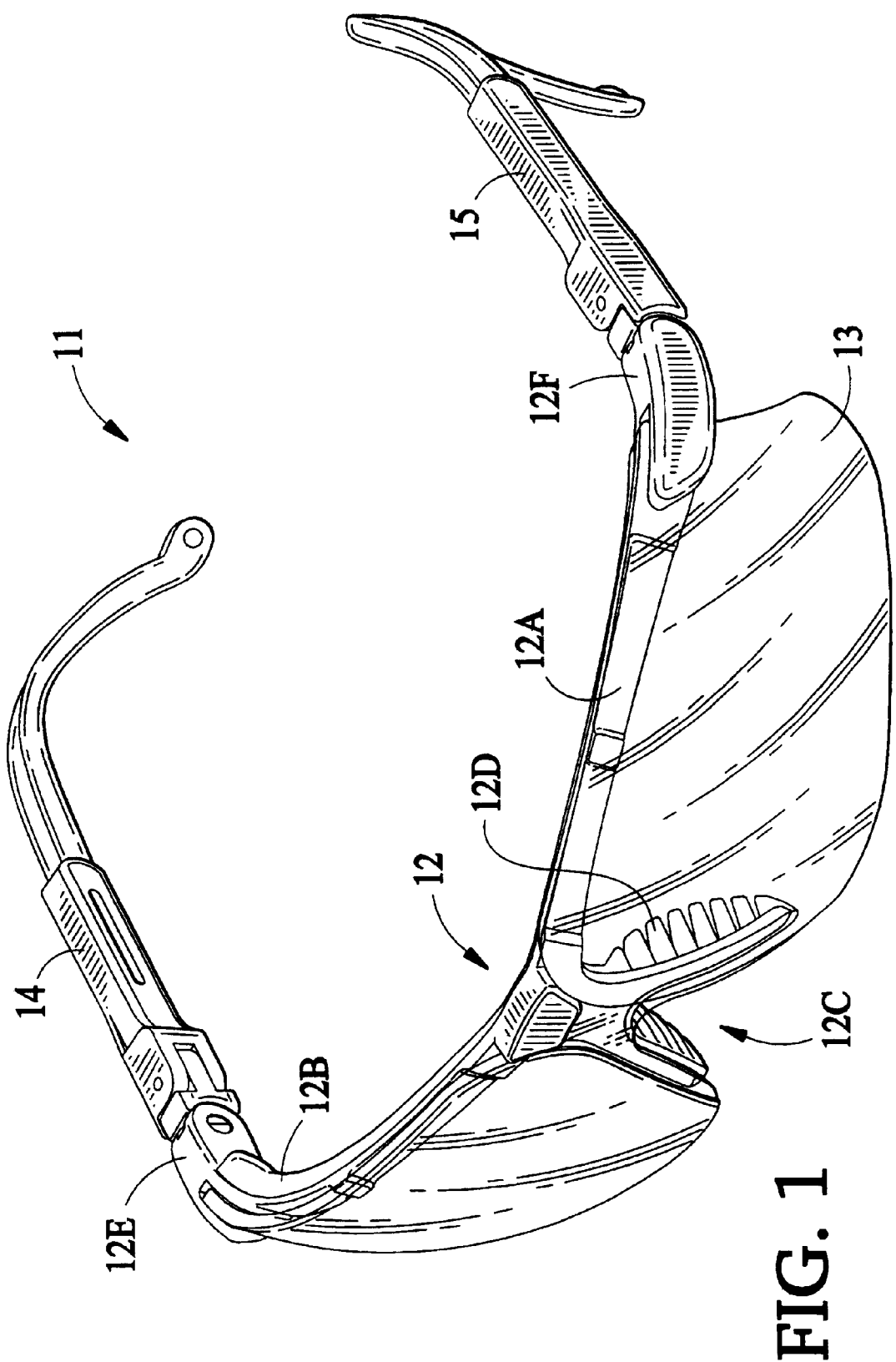
FIG. 1 is a perspective view of an embodiment of the invention.

With reference now to the drawing, and more particularly FIG. 1 thereof, there is shown a perspective view of eye covering structure according to the invention. The eye covering structure includes a unitary structure 12 made by a two-shot process in a single mold with an outer hard portion 12A bonded to a soft inner portion 12B having a nose piece 12C with the soft inner portion 12B formed with flexible fingers such as 12D for engaging the nose of a wearer. Transparent lens portion 13 is seated in hard outer portion 12A. Single shot temple pieces 14A and 15A also seat into ends 12E and 12F. The temples have a length adjustable feature. 12G and 12H are ratchet adjustment features allowing the lens angle to be adjusted on the face for a comfortable fit. Two shot temple pieces 14 and 15 are seated in ends 12E and 12F of hard portion 12A. Hard portion 12A is formed with four channels 12G to allow air to vertically circulate on the side of lens portion 13.

Figure 2:
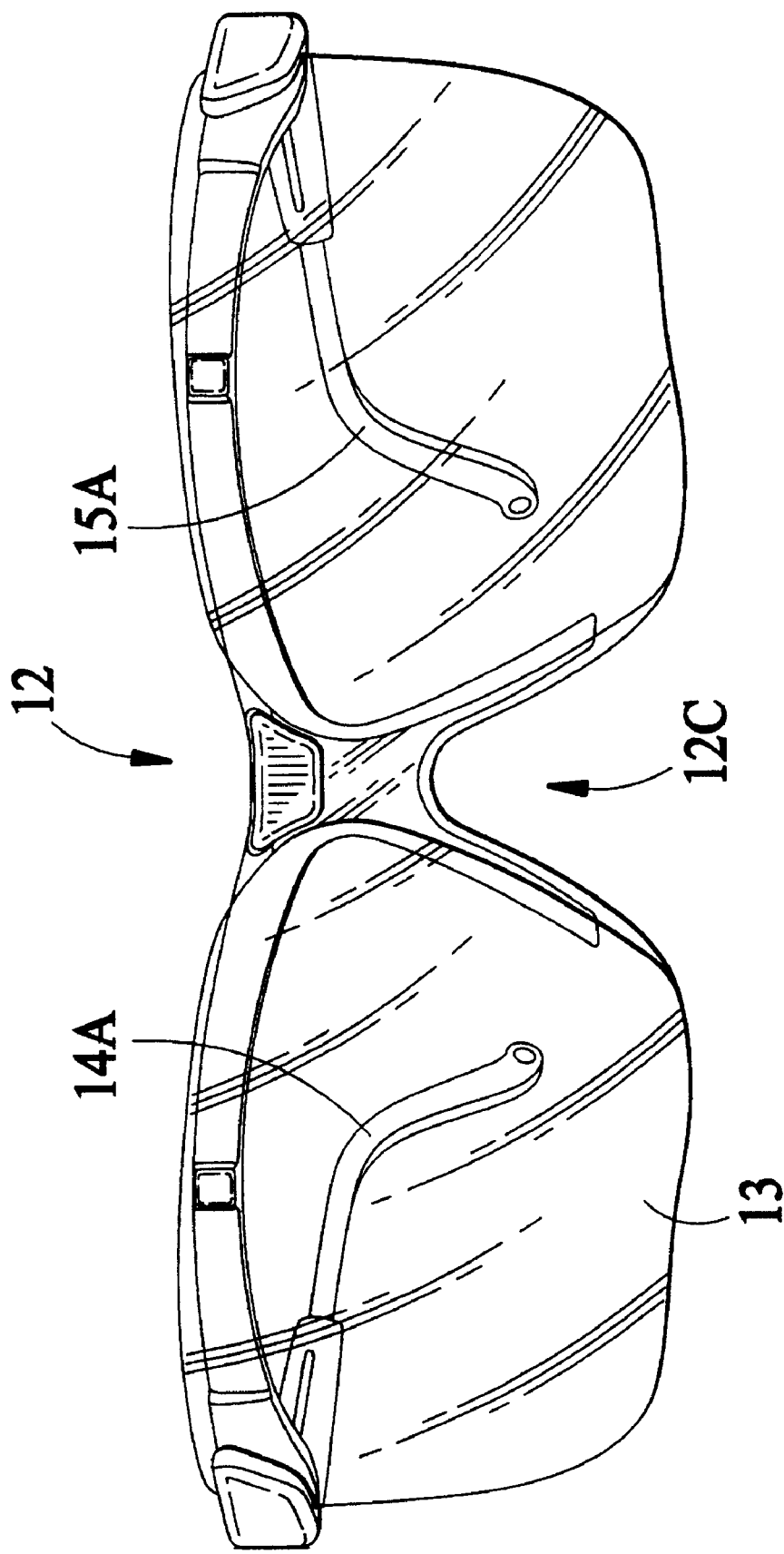
FIG. 2 is a front view of the embodiment of FIG. 1.

Referring to FIG. 2, there is shown a front view of the embodiment of FIG. 1.

Figure 3A:
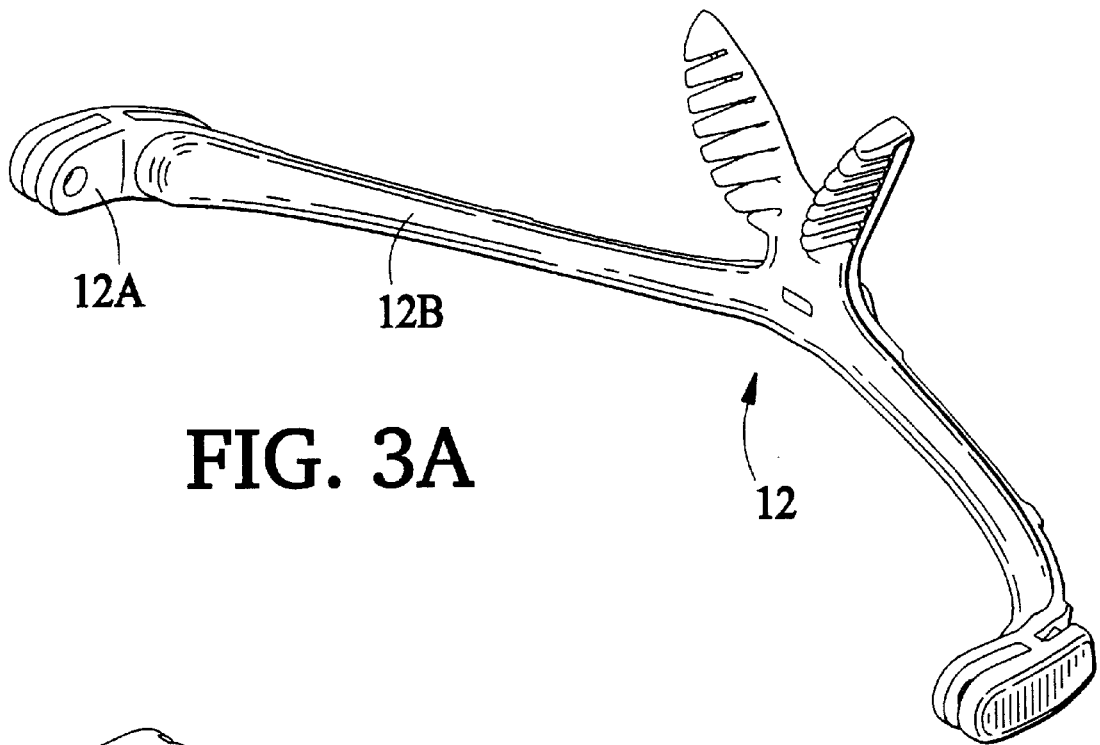
FIGS. 3A and 3B are perspective views of the unitary structure made by the two-shot process in a single mold looking toward the inside and outside, respectively.
Figure 3B:
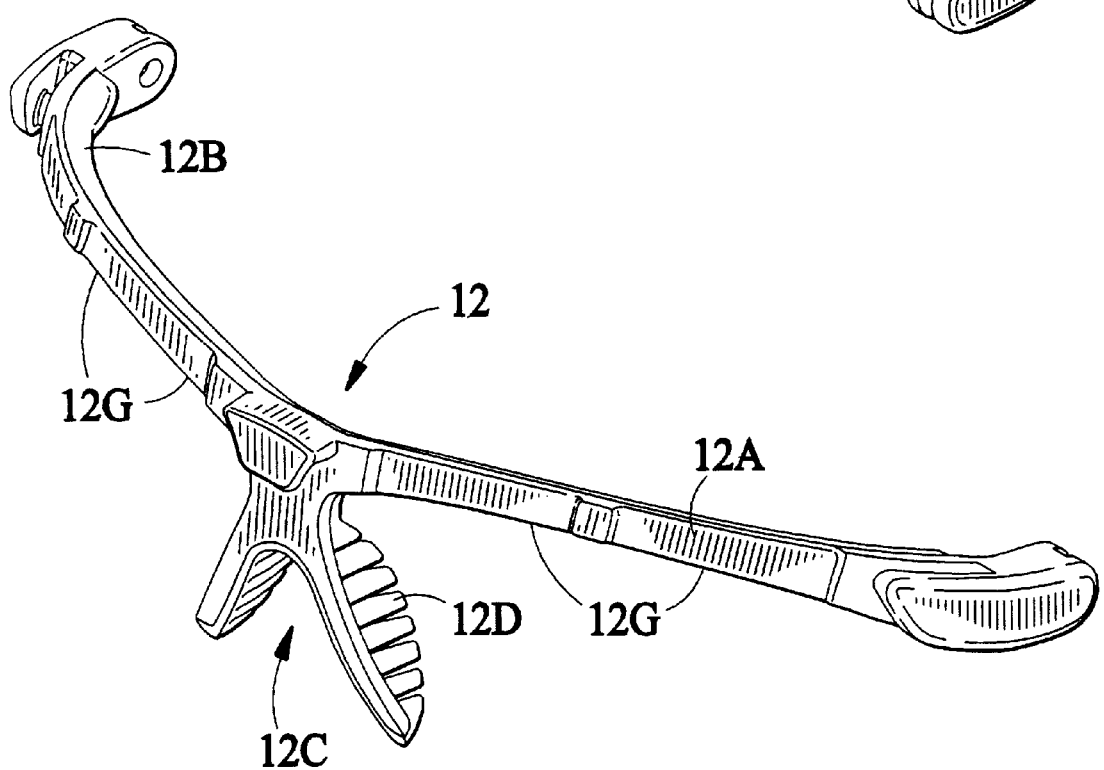

Referring to FIGS. 3A and 3B, there are shown perspective views of unitary structure 12 looking toward the soft inside and hard outside portions, respectively.

Figure 4:
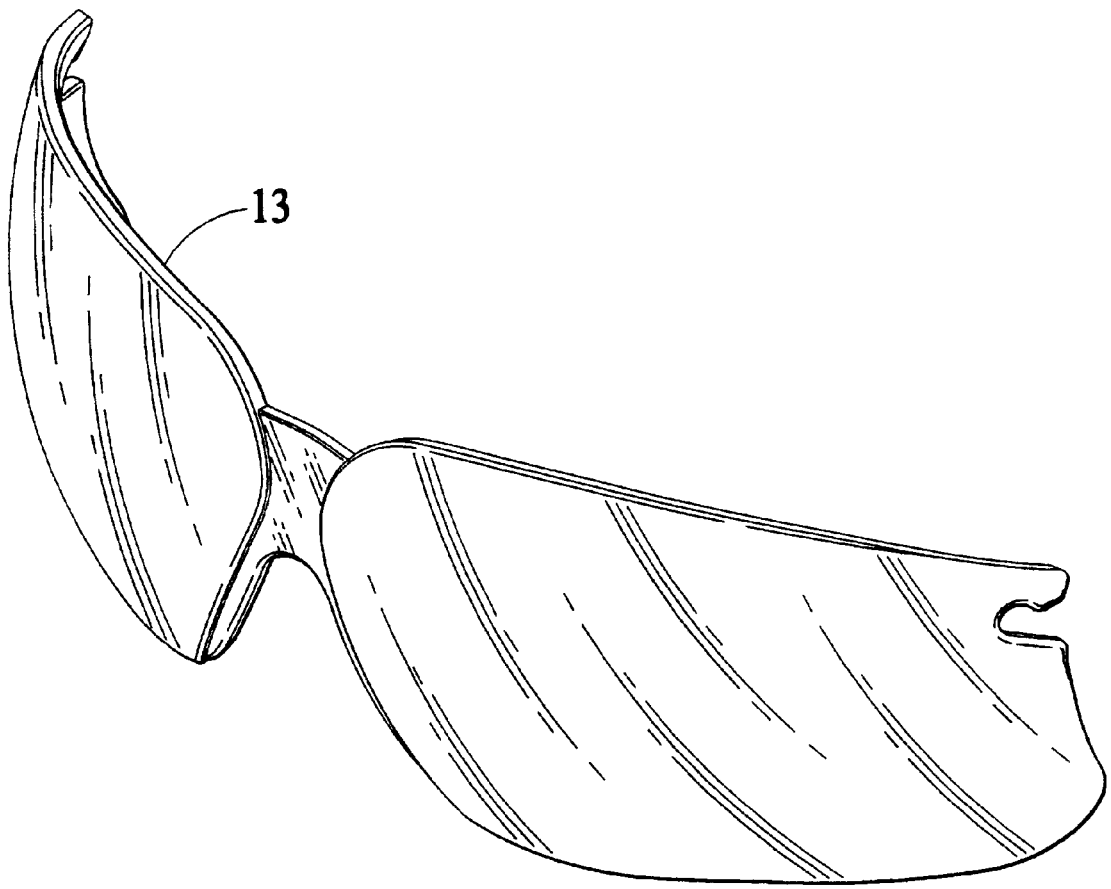
FIG. 4 is a perspective view of the transparent lens portion.

Referring to FIG. 4, there is shown a perspective view of transparent lens 13.

Figure 5:
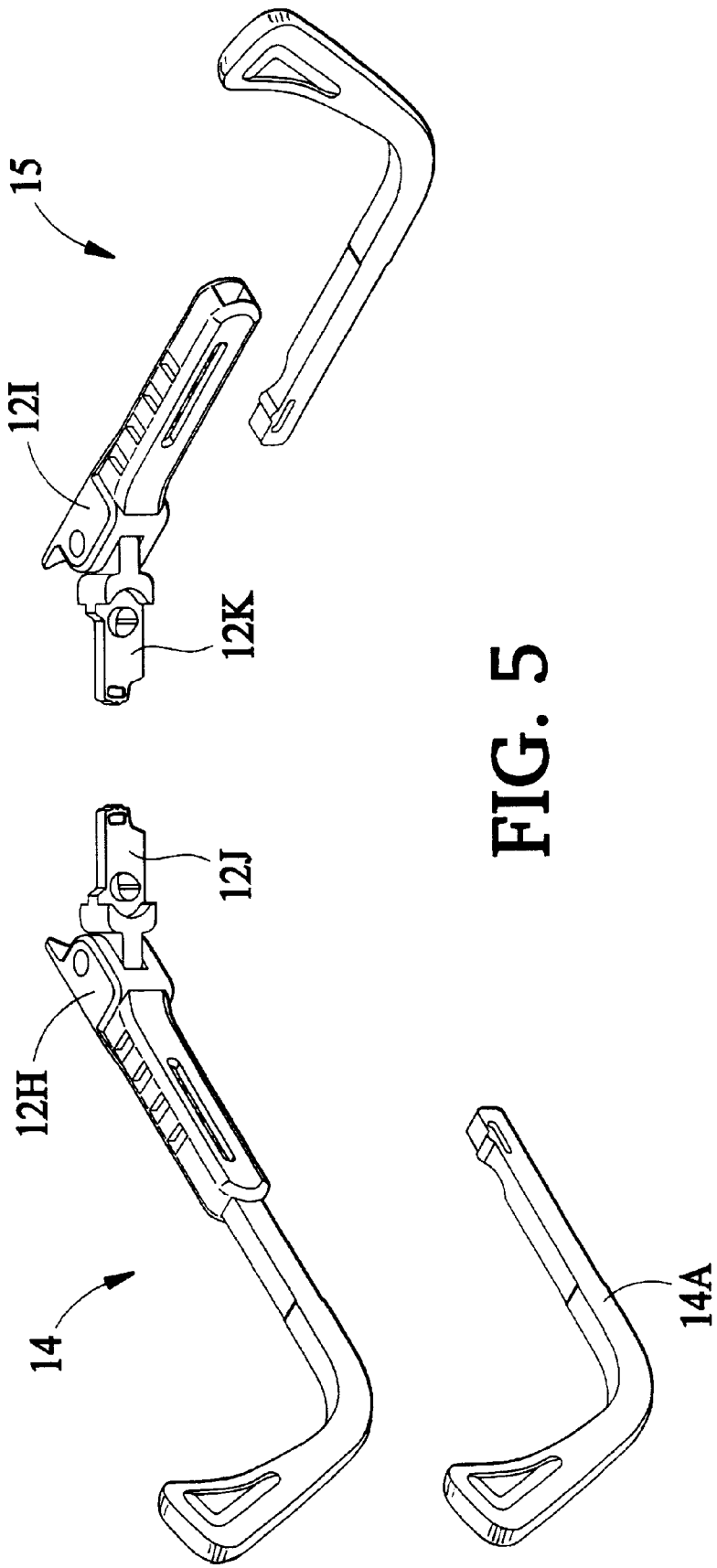
FIG. 5 is a perspective view of the temple structure.

Referring to FIG. 5, there is shown a perspective view of the elements of temple pieces 14 and 15. The temple pieces may be substantially of the form shown in the aforesaid U.S. Pat. No. 5,457,505 (note: two types shown).

The invention has a number of advantages. Having the unitary structure made by the two-shot process in a single mold with the soft inner portion chemically bonded to the hard outer portion creates a structure maintainable to desired specifications capable of securely accommodating an easily replaceable transparent lens structure, maintaining the desired position of the nose piece, providing a comfortable seal for the wearer and affording good protection from shock created by a force applied to the transparent lens structure and affording ventilation. The finger structure on the nosepiece comfortably engages the nose of the wearer while maintaining a desired position of the eye covering structure. The structure also readily accommodates temple pieces that may be pivotable and extendable in the manner described in the aforesaid U.S. Pat. No. 5,457,505 to allow adjustment for a variety of wearers. The ratchet adjustment features allow the lens to be adjusted on the face for a comfortable fit. Manufacturing costs are relatively low for providing such a superior structure.

Suitable materials for the soft portions are thermal plastic elastomers with suitable durometers, and suitable materials for hard portions are polycarbonate polyolefins and nylon.

It is evident that those skilled in the art may now make numerous uses and modifications of and departures from the specific apparatus and techniques described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A unitary structure for an eye covering comprising,
   a soft inner portion adapted to engage the brow and nose of a wearer and a hard outer portion adapted to support a transparent lens portion and temple pieces and formed by a two-shot process in a single mold that chemically bonds the soft portion to the hard portion.

2. A unitary structure in accordance with claim 1 wherein said unitary structure is formed with a nose piece with the soft portion thereof having a plurality of flexible fingers adapted for engaging the nose of a wearer.

3. A unitary structure in accordance with claim 1 and further comprising, a transparent lens portion detachably secured to the hard portion and depending from the brow portion thereof.

4. A unitary structure in accordance with claim 2 and further comprising, a transparent lens portion detachably secured to the hard portion and depending from the brow portion thereof.

5. A unitary structure in accordance with claim 2 constructed and arranged to position the lens portions to provide a series of vertical venting areas between the inside surface of the lens portions and the unitary structure.

6. A unitary structure in accordance with claim 1 and further comprising,
   temple pieces connected to the ends of said hard portion.

7. A method of making the unitary structure for an eyecovering in accordance with claim 1 using a two-shot process that chemically bonds a first hard material forming said hard outer portion to a second soft material forming said soft inner portion in the same mold.

8. A method in accordance with claim 7 wherein the first hard material is from the group consisting of polycarbonate polyolefins and nylon and the second soft material is from the group consisting of thermal plastic elastomers.

* * * * *

(12) EX PARTE REEXAMINATION CERTIFICATE (6355th)
United States Patent
Canavan

(10) Number: US 6,196,681 C1
(45) Certificate Issued: Aug. 12, 2008

(54) EYE COVERING

(75) Inventor: Richard W. Canavan, Woodstock, CT (US)

(73) Assignee: Bacou-Dalloz Eye & Face Protection, Inc., Smithfield, RI (US)

Reexamination Request:
No. 90/006,118, Sep. 28, 2001
No. 90/006,254, Mar. 26, 2002

Reexamination Certificate for:
Patent No.: 6,196,681
Issued: Mar. 6, 2001
Appl. No.: 09/573,577
Filed: May 18, 2000

(51) Int. Cl.
*G02C 1/04* (2006.01)

(52) U.S. Cl. .................... 351/106; 351/103; 351/83; 351/86

(58) Field of Classification Search .............. 351/41, 351/44, 62, 83–86, 103–109, 136–139, 154; 2/435–437
See application file for complete search history.

(56) References Cited

U.S. PATENT DOCUMENTS

| | | | | |
|---|---|---|---|---|
| 4,070,104 A | | 1/1978 | Rice | 351/138 |
| 4,302,080 A | * | 11/1981 | Bononi | 351/139 |
| 4,951,322 A | * | 8/1990 | Lin | 2/439 |
| 4,955,706 A | * | 9/1990 | Schmidthaler et al. | 351/41 |
| 5,345,616 A | * | 9/1994 | Wiedner | 2/446 |
| 5,495,303 A | * | 2/1996 | Kolentsi | 351/43 |
| 5,617,588 A | | 4/1997 | Canavan et al. | 2/428 |
| 5,703,669 A | * | 12/1997 | Park | 351/86 |
| 5,760,868 A | | 6/1998 | Jannard et al. | 351/153 |
| 5,805,258 A | * | 9/1998 | Wiedner | 351/110 |
| 5,825,455 A | * | 10/1998 | Fecteau et al. | 351/159 |
| 5,841,505 A | * | 11/1998 | Bolle' | 351/44 |
| 5,867,841 A | * | 2/1999 | Chiang | 2/436 |
| 5,903,331 A | * | 5/1999 | Lin | 351/105 |
| 5,909,267 A | * | 6/1999 | Hall et al. | 351/120 |

FOREIGN PATENT DOCUMENTS

| | | | |
|---|---|---|---|
| CN | 1203376 A | 12/1998 | |
| JP | 4-75019 | * 7/1990 | 351/41 |
| WO | WO 99/56942 | 11/1999 | 264/254 |

OTHER PUBLICATIONS

An English abstract of CN 1203376A.*

* cited by examiner

*Primary Examiner*—Margaret Rubin

(57) ABSTRACT

A unitary structure for an eye covering comprises an outer hard portion chemically bonded to an inner soft portion made by a two-shot process in a single mold.

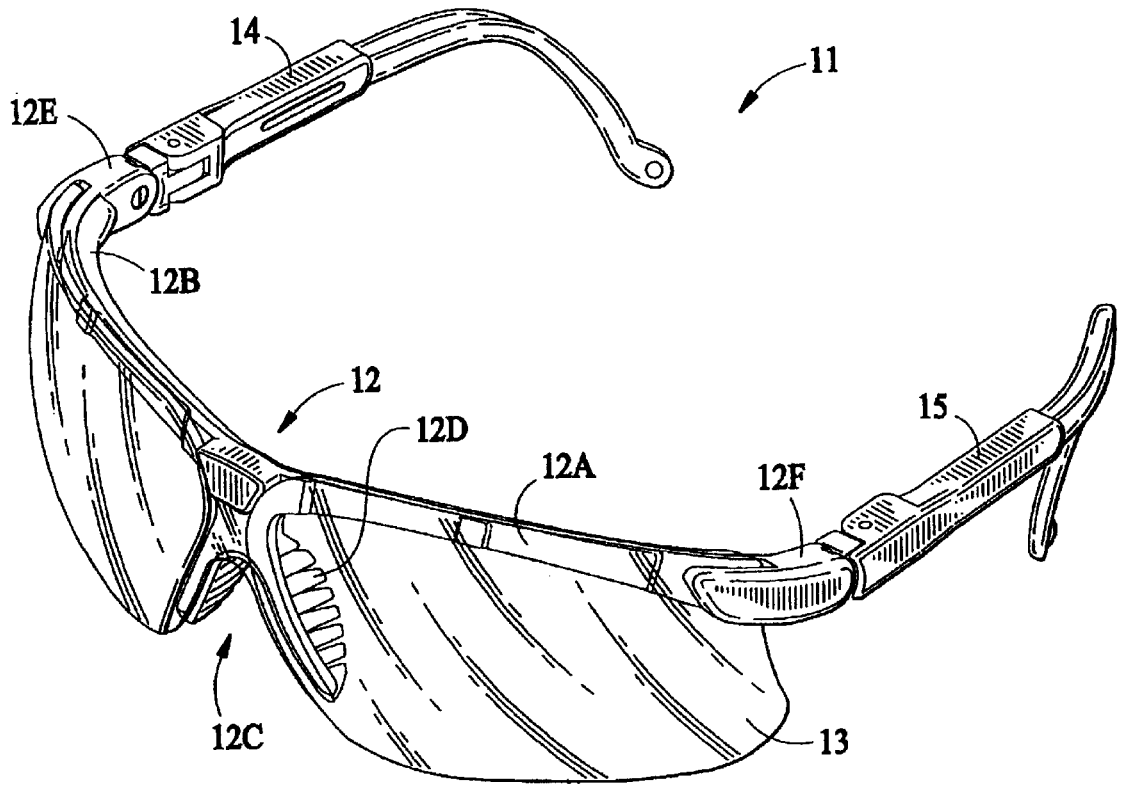

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *